United States Patent
Oh et al.

(10) Patent No.: US 11,628,723 B2
(45) Date of Patent: Apr. 18, 2023

(54) METHOD OF CONTROLLING POSTURE OF VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 23 days.

(21) Appl. No.: 16/927,383

(22) Filed: Jul. 13, 2020

(65) Prior Publication Data

US 2021/0039493 A1 Feb. 11, 2021

(30) Foreign Application Priority Data

Aug. 7, 2019 (KR) .................. 10-2019-0095953

(51) Int. Cl.
| | | |
|---|---|---|
| *B60L 3/10* | (2006.01) | |
| *B60K 23/08* | (2006.01) | |
| *B60W 40/13* | (2012.01) | |
| *B60W 10/20* | (2006.01) | |
| *B60W 40/105* | (2012.01) | |

(Continued)

(52) U.S. Cl.
CPC .......... *B60K 23/0808* (2013.01); *B60L 3/106* (2013.01); *B60L 15/00* (2013.01); *B60L 15/2036* (2013.01); *B60W 10/20* (2013.01); *B60W 40/105* (2013.01);

(Continued)

(58) Field of Classification Search
CPC .... B60K 23/0808; B60K 1/00; B60K 17/356; B60K 7/0007; B60W 10/20; B60W 40/105; B60W 40/13; B60W 2040/1384; B60W 2520/30; B60W 2720/403; B60W 30/045; B60W 10/119; B60G 17/018; B60G 2400/20; B60G 2800/01; B60G 2800/244; B60G 2800/246; B60L 3/106; B60L 15/00
See application file for complete search history.

(56) References Cited

U.S. PATENT DOCUMENTS 5,737,714 A * 4/1998 Matsuno ............ B60K 17/3462
701/89
8,271,159 B2 * 9/2012 Krober ............... B60G 17/0162
701/31.4

(Continued)

FOREIGN PATENT DOCUMENTS

JP H10210605 A * 8/1998

*Primary Examiner* — Donald J Wallace
*Assistant Examiner* — Daniel M. Robert
(74) *Attorney, Agent, or Firm* — Fox Rothschild LLP

(57) ABSTRACT

A method of controlling posture of a vehicle is provided to determine a minute tendency of understeer or oversteer of the vehicle and to control the posture of the vehicle when recognizing the minute tendency of the understeer or oversteer while driving the vehicle straight. The includes determining whether torque is applied to drive wheels while driving the vehicle and acquiring equivalent inertia information of a drive system in real time based on drive system operation information in response to determining that the torque is being applied to the drive wheels. The understeer or oversteer of the vehicle is determined from the equivalent inertia information obtained in real-time.

20 Claims, 2 Drawing Sheets

(51) Int. Cl.
*B60L 15/00* (2006.01)
*B60L 15/20* (2006.01)

(52) U.S. Cl.
CPC ..... *B60W 40/13* (2013.01); *B60W 2040/1384* (2013.01); *B60W 2520/30* (2013.01)

(56) References Cited

U.S. PATENT DOCUMENTS

| | | | |
|---|---|---|---|
| 9,233,682 B2 * | 1/2016 | Endo | B60W 10/08 |
| 10,086,838 B2 * | 10/2018 | Flaum | B60K 7/0007 |
| 2003/0010559 A1 * | 1/2003 | Suzuki | B60K 28/16 |
| | | | 180/233 |
| 2010/0332094 A1 * | 12/2010 | Wu | B60K 23/0808 |
| | | | 701/69 |
| 2016/0152238 A1 * | 6/2016 | Mita | B60K 23/0808 |
| | | | 180/197 |
| 2016/0229290 A1 * | 8/2016 | Chimner | B60K 23/0808 |
| 2016/0297440 A1 * | 10/2016 | Lee | B60W 10/08 |
| 2017/0246957 A1 * | 8/2017 | Ienaga | B60K 7/0007 |
| 2017/0317631 A1 * | 11/2017 | Lee | B60L 15/20 |
| 2019/0193569 A1 * | 6/2019 | Oh | F16D 61/00 |
| 2019/0193577 A1 * | 6/2019 | Kaneko | B60T 8/1764 |

\* cited by examiner

METHOD OF CONTROLLING POSTURE OF VEHICLE

CROSS REFERENCE TO RELATED APPLICATION

The present application claims priority to Korean Patent Application No. 10-2019-0095953, filed Aug. 7, 2019, the entire contents of which is incorporated herein for all purposes by this reference.

BACKGROUND

Field of the Disclosure

The present disclosure relates to a method of controlling posture of a vehicle, and more particularly, to a method of controlling posture of a vehicle which determines a minute tendency of understeer or oversteer of a vehicle even while driving straight, and adjusts the posture of the vehicle when the minute tendency is recognized while driving the vehicle straight.

Description of the Related Art

In general, to adjust the posture of the vehicle and secure stability while driving, it is important to accurately determine or predict an occurrence of the understeer or oversteer of the vehicle and to perform effective and immediate control to respond to the occurrence. In the related art, a deviation of a yaw rate value which is measured with respect to a reference yaw rate value is calculated using vehicle speed information and detected information such as a lateral acceleration sensor and a yaw rate sensor. Based on the deviation of the yaw rate value calculated as above, the understeer or oversteer of the vehicle is determined while driving.

However, the conventional method is applicable only when a driver's steering angle input occurs (e.g., operating a steering wheel), or a lateral movement of the vehicle is sufficient. Therefore, the above information is not a criterion for determining the understeer or oversteer when driving the vehicle straight. In addition, the phenomenon of the understeer and oversteer occurring while turning the vehicle has become a cause that deteriorates the vehicle's stability, and an electronic stability program (ESP) is regarded as a control to solve this problem.

The ESP secures yaw stability by applying a braking force to an inner rear wheel for the understeer and an outer front wheel for the oversteer. The ESP is based on a principle of applying an additional braking force to a wheel shaft having a sufficient frictional force on the friction circle to form a braking moment, thereby adjusting the yaw of the vehicle. However, due to requiring the additional braking force, this principle causes a different movement of the vehicle from the driver's intention and has a disadvantage of inefficiency.

SUMMARY

Therefore, the present disclosure provides a method of determining the minute tendency of the understeer or oversteer even before turning of a vehicle begins. In addition, another object of the present disclosure is to provide a method of controlling posture of a vehicle when tendency of understeer or oversteer is recognized ahead of time before tuning of the vehicle begins.

According to one aspect of the present disclosure, a method of controlling posture of a vehicle may include: determining by a controller whether torque is applied to drive wheels while driving the vehicle; acquiring equivalent inertia information of a drive system in real time based on drive system operation information when the controller determines that the torque is being applied to the drive wheels; and determining by the controller understeer or oversteer of the vehicle from the equivalent inertia information obtained in real time.

In addition, in the determining of whether the torque is applied to the drive wheels, the controller may be configured to determine that the torque is applied to the drive wheels when a torque command for a drive device for driving the vehicle is greater than a predetermined command reference value. The vehicle may be a four-wheel-drive vehicle having a front-wheel-drive motor and a rear-wheel-drive motor as drive devices for driving the vehicle. The vehicle may be a front-wheel-drive vehicle having a front-wheel-drive motor as a drive device for driving the vehicle, or a rear-wheel-drive vehicle having a rear-wheel-drive motor as the drive device for driving the vehicle. In addition, the drive system operation information may be information of a drive system speed and a torque command in a previous control period for a drive device for driving the vehicle. The drive system speed may be one of speeds of the drive wheels, a speed of the drive device, a transmission input shaft rotational speed, and a transmission output shaft rotational speed.

Further, the vehicle may be a four-wheel-drive vehicle having a front-wheel drive device and a rear-wheel drive device as drive devices for driving the vehicle, and the equivalent inertia information of the drive system may include a variation of equivalent inertia of a front-wheel side obtained in real time from operational information of a front-wheel-side drive system and a variation of equivalent inertia of a rear-wheel side obtained in real time from operation information of a rear-wheel-side drive system. The controller may be configured to determine that the vehicle is understeered or oversteered in response to determining that a difference between the variation of the equivalent inertia of the front-wheel side and the variation of the equivalent inertia of the rear-wheel side is greater than a predetermined difference reference value.

In addition, the controller maybe configured to determine that the vehicle is understeered in response to determining that the difference as a result of subtracting the variation of the equivalent inertia of the rear-wheel side from the variation of the equivalent inertia of the front-wheel side is greater than a predetermined first difference reference value. The controller maybe configured to determine that the vehicle is oversteered in response to determining that the difference as a result of subtracting the variation of the equivalent inertia of the front-wheel side from the variation of the equivalent inertia of the rear-wheel side is greater than a predetermined second difference reference value.

The vehicle may be a front-wheel-drive vehicle having a front-wheel drive device as a drive device for driving the vehicle, and the equivalent inertia information of the drive system may include a variation of equivalent inertia of a front-wheel side obtained in real time from operational information of a front-wheel-side drive system. In addition, the controller maybe configured to determine that the vehicle understeered in response to determining that the variation of the equivalent inertia of the front-wheel side is greater than a predetermined variation reference value.

The vehicle may be a rear-wheel-drive vehicle having a rear-wheel drive device as a drive device for driving the vehicle, and the equivalent inertia information of the drive system may include a variation of equivalent inertia of a rear-wheel side obtained in real time from operational information of a rear-wheel-side drive system. In addition, the controller may be configured to determine that the vehicle is oversteered when the variation of the equivalent inertia of the rear-wheel side is greater than a predetermined variation reference value.

Furthermore, the method of controlling posture of a vehicle may include: performing by the controller a correction to reduce a torque command for a drive device for driving the vehicle in response to determining that the vehicle is understeered or oversteered; and adjusting an operation of the drive device according to a corrected torque command. In addition, in the performing of the correction to reduce the torque command, the controller may be configured to perform the correction to reduce the torque command for a front-wheel drive device when the vehicle is understeered and the controller maybe configured to perform the correction to reduce the torque command for a rear-wheel drive device when the vehicle oversteered. In addition, a torque correction to reduce the torque command may be determined based on the equivalent inertia information of a drive system.

In addition, the vehicle may be a four-wheel-drive vehicle having a front-wheel drive device and a rear-wheel drive device as drive devices for driving the vehicle, and the equivalent inertia information of the drive system to determine the torque correction may include a variation of equivalent inertia of a front-wheel side obtained in real time from operational information of a front-wheel-side drive system and a variation of equivalent inertia of a rear-wheel side obtained in real time from operation information of a rear-wheel-side drive system.

The controller maybe configured to determine the torque correction amount based on a difference between the variation of the equivalent inertia of the front-wheel side and the variation of the equivalent inertia of the rear-wheel side. In addition, the vehicle may be a front-wheel-drive vehicle having a front-wheel drive device as the drive device for driving the vehicle, and the equivalent inertia information of the drive system to determine the torque correction may include a variation of equivalent inertia of a front-wheel side obtained in real time from operational information of a front-wheel-side drive system. The vehicle may be a rear-wheel-drive vehicle having a rear-wheel drive device as the drive device for driving the vehicle, and the equivalent inertia information of the drive system to determine the torque correction may include a variation of equivalent inertia of a rear-wheel side obtained in real time from operational information of a rear-wheel-side drive system.

Thus, in accordance with the method of controlling posture of the vehicle according to the present disclosure, when torque is applied to the drive wheels even when there is no lateral movement while driving the vehicle straight, determining the understeer or oversteer of the vehicle becomes possible based on the equivalent inertia, and the posture control of the vehicle which may suppress the understeer or oversteer maybe performed based on the information of the equivalent inertia.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
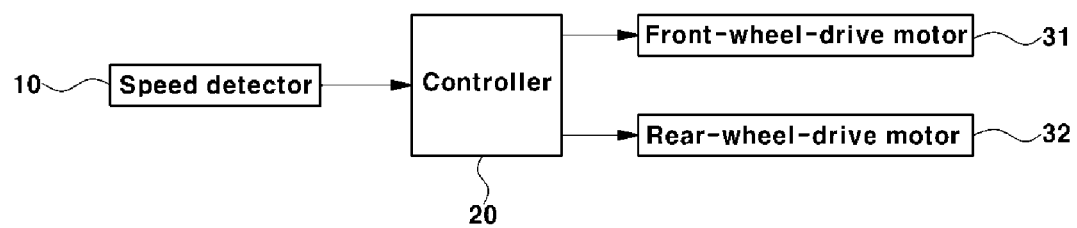
FIG. 1 is a block diagram schematically illustrating a configuration of a system performing posture control of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art may easily implement the present disclosure. However, the present disclosure is not limited to the embodiments described herein and may be embodied in other forms.

The present disclosure relating to a method of posture control of a vehicle may include determining a tendency and a level of the minute understeer or oversteer of the vehicle when torque is applied to drive wheels even when there is no lateral movement while driving the vehicle straight. In addition, the present disclosure provides the method to suppress the tendency of the understeer or oversteer by adjusting the torque applied to front wheels and rear wheels, including a process of adjusting posture of the vehicle when the tendency of the understeer or oversteer is detected while driving the vehicle straight.

The present disclosure is useful for a motor-driven vehicle such as a battery-electric vehicle (BEV), a hybrid electric vehicle (HEV), and a fuel cell electric vehicle (FCEV), which are environmentally friendly vehicles using a motor as a source of driving the vehicle, that is, as a drive device. In other words, the method of posture control of the vehicle according to the present disclosure performs real-time, immediate and instant torque control of the drive device based on equivalent inertia to suppress tendency and occurrence of the understeer or oversteer, as described below. Therefore, the method of posture control is useful in the vehicle which is equipped with a motor as a drive device having faster control response than a conventional engine.

In addition, the present disclosure maybe applied to vehicles having a single drive device or a plurality of drive devices. For example, the present disclosure maybe applied to a front-wheel-drive vehicle equipped with a front-wheel-drive motor or a rear-wheel-drive vehicle equipped with a rear-wheel-drive motor, as a vehicle having a single drive device. Alternatively, the present disclosure maybe applied to a vehicle having a plurality of drive devices that respectively apply driving force to the front wheels and the rear wheels, that is, a four-wheel-drive vehicle having both a front-wheel-drive motor and a rear-wheel-drive motor.

In the present disclosure, as described later, the equivalent moment of inertia of each drive system may be determined based on drive system operation information at the drive-wheel side, the tendency of the understeer or oversteer of the vehicle may be determined based on the determined equivalent inertia information, and posture of the vehicle may be adjusted by correcting the torque applied to the drive wheels in response to determining the tendency of the understeer or oversteer. Particularly, the drive system operation information at the drive-wheel side may include the torque command of the previous control period for the drive device and the speed information of each drive system.

Further, when torque is applied to the front and rear wheels when the front and rear wheels are drive wheels connected respectively to the drive device, the correction of the torque applied to the front wheels and the rear wheels in the present disclosure refers to the correction of the torque of the front-wheel-drive motor and the rear-wheel-drive motor as each of the drive device, also referring to the correction of the torque commands of the front-wheel-drive motor and the rear-wheel-drive motor.

Hereinafter, an exemplary embodiment of the present disclosure will be described in detail with reference to the drawings. FIG. 1 is a block diagram schematically illustrating the configuration of a system for performing vehicle posture control according to the present disclosure. The configuration of a system illustrates for performing vehicle posture control and determining the tendency of the understeer/oversteer in a four-wheel-drive vehicle equipped with a front-wheel-drive motor 31 and a rear-wheel-drive motor 32.

As illustrated in FIG. 1, a system for performing vehicle posture control according to an exemplary embodiment of the present disclosure may include a speed detector 10 configured to detect a drive system speed, a controller 20 configured to receive information of the drive system speed detected by the speed detector 10 and generate a corrected torque command for adjusting the vehicle posture, and drive devices 31 and 32 configured to operate according to the corrected torque command generated and output by the controller 20. In particular, the drive device may be a single device or a plurality of drive devices. The single drive device may be a front-wheel-drive motor or a rear-wheel-drive motor, and a plurality of drive devices as shown in FIG. 1 may include the front-wheel-drive motor 31 and the rear-wheel-drive motor 32.

In the present disclosure, in a condition that a torque of a predetermined level or greater is applied to the drive wheels, that is, when the torque command of the front-wheel-drive motor 31 and the rear-wheel-drive motor 32 are greater than the respective command reference values, the understeer and oversteer tendency and occurrence may be determined based on the equivalent inertia information obtained from the drive system operation information on the front-wheel side and the rear-wheel side.

The determination of the understeer/oversteer according to the present disclosure and the torque correction control following the result of the determination may be performed by the on-board controller 20. The on-board controller 20 may be the controller configured to perform the known determination of the understeer/oversteer and vehicle posture control. This controller may indicate a single controller or a plurality of controllers performing cooperative control.

In the present disclosure, controller 20 may be one integrated controller without a separate drive device or a plurality of controllers provided for each drive device. Particularly, the controller may include a controller for the front-wheel-drive motor 31 and a controller for the rear-wheel-drive motor 32. In addition, the controller 20 may be a controller providing a concept of including both a vehicle controller which is an upper controller configured to perform cooperative control in a vehicle and a motor controller which is a lower controller.

In the present disclosure, controller 20 may be configured to generate the primary torque command in an ordinary manner required for driving the vehicle, based on the inputs of driving by a driver or of cruise mode. Particularly, the torque command is the torque command for the drive device, and specifically, may be the torque command for the front-wheel-drive motor 31 and the rear-wheel-drive motor 32. Moreover, the controller 20 may be configured to determine the equivalent inertia of the drive system from the information of the drive system speed and the torque command of the previous control cycle for the front-wheel-drive motor 31 and the rear-wheel-drive motor 32, which is operation information of drive system on the front-wheel side and the rear-wheel side. After determining the understeer/oversteer based on the determined equivalent inertia information, the torque correction amount for adjusting the vehicle posture may be calculated using the equivalent inertia information which is based on the determination result.

Subsequently, the controller 20 may be configured to correct the primary torque command by using the calculated torque correction amount and execute the operation of the front-wheel-drive motor 31 or the rear-wheel-drive motor 32 with the corrected torque command. The equivalent inertia may be obtained from the relationship of '$Tq = I \times \alpha$', where '$Tq$' is torque, '$I$' is equivalent inertia, and '$\alpha$' is an angular acceleration. The required inertia maybe calculated from the torque information transmitted through the drive system.

In particular, the torque may be the torque command of the previous control period as the final torque command, that is, the torque command of the previous control period for the drive device. When the torque correction is executed based on the information of the previous equivalent inertia in the previous control period, the torque correction may be the corrected torque command of the previous control period.

The speed of drive system for obtaining the equivalent inertia may be a wheel speed of the drive wheels connected to the drive device, or may be a rotational speed of the drive device, that is, a motor speed. This speed maybe a rotation speed of the transmission input shaft or a transmission output shaft.

Accordingly, the speed of drive system may refer to a rotational speed of a drive element existing in a path through which the driving force (torque) is transmitted from a drive device(motor) for driving a vehicle to drive wheels. The speed maybe the real-time information of rotational speed of the drive system as a measured value detected by a speed detector 10 as shown in FIG. 1. In the present disclosure, when the speed of drive system is the speed of the drive wheels, the speed detector 10 may be a wheel speed sensor installed in the drive wheels. Alternatively, when the speed of drive system is the speed of motor in the present disclosure, the speed detector 10 may be a known resolver installed in each motor.

In the present disclosure, when the vehicle is a four-wheel-drive vehicle having both the front-wheel-drive motor 31 and the rear-wheel-drive motor 32, the speed of drive system becomes the speed of drive system at front-wheel side and speed of drive system at the rear-wheel side. In this case, the speed detector 10 may be a wheel speed sensor installed at each of the front wheels and the rear wheels or a resolver installed at the front-wheel-drive motor 31 and the rear-wheel-drive motor 32, respectively.

Alternatively, the speed of drive system may be an observational speed of drive system by the observer, not a measured value, or the speed of measuring drive system. The observational speed of drive system may be used together as the speed of drive system for calculating the equivalent inertia information. In the following description of the control process, an example of a four-wheel-drive vehicle having a front-wheel-drive motor 31 and a rear-wheel-drive motor 32 will be described.

Figure 2:
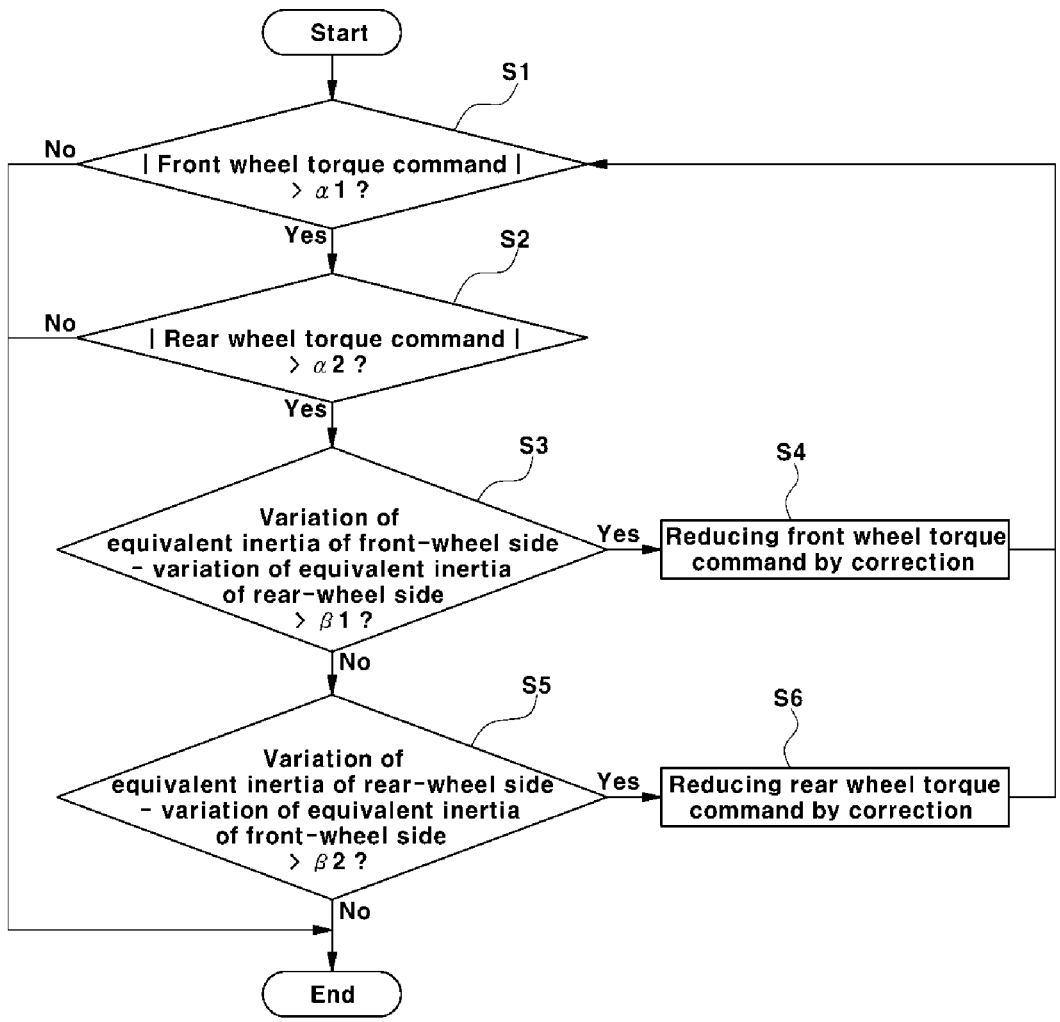
FIG. 2 is a flowchart illustrating a posture control process of a vehicle according to an exemplary embodiment of the present disclosure.

FIG. 2 is a flowchart illustrating a posture control process of a vehicle according to an exemplary embodiment of the present disclosure. In the present disclosure, the tendency and level of the minute understeer or oversteer of a vehicle maybe determined when torque is applied to the drive wheels even when there is no lateral movement while driving the vehicle straight. However, in the vehicle to which the present disclosure is applied, it is advantageous to use a conventional determination method for yaw rate-based understeer and oversteer when there is only a lateral movement without torque applied to the drive wheels.

Accordingly, in the present disclosure, the newly disclosed determination method for equivalent inertia-based understeer/oversteer and the conventional determination method for the yaw rate-based understeer/oversteer can be applied together, and it may be possible to take the result of the two methods from which the result is first obtained. The conventional determination methods for the yaw rate-based understeer/oversteer and the processes are well-known technical matters to those skilled in the art, and thus detailed descriptions thereof will be omitted.

In addition, as previously described, the present disclosure may be applied to a vehicle having a single drive device rather than having a plurality of drive devices. In a vehicle in which the torque is not applied to both the front and rear wheels, the present disclosure is applicable only to determine either the understeer or oversteer. In other words, in the case of a front-wheel-drive vehicle, an equivalent inertia-based determination method is used only to determine the understeer, and a conventional yaw rate-based determination method is used to determine the oversteer.

At this time, in the front-wheel-drive vehicle, the conventional method for yaw rate-based determination and the method newly disclosed in the present disclosure for equivalent inertia-based determination may be used in parallel for the determination of the understeer, and the result of the faster determination may be followed. In the case of a rear-wheel-drive vehicle, a method for the equivalent inertia-based determination is used only to determine the understeer and oversteer, and the method depends on conventional yaw rate-based determination.

At this time, in the rear-wheel-drive vehicle, the conventional method for yaw rate-based determination and the method for equivalent inertia-based determination may be used in parallel for the determination of the oversteer, and the result of the faster determination may be followed. Further, based on the equivalent inertia information according to the determined result of the understeer and oversteer, the present disclosure includes a control process for correcting the torque applied to the front wheels or the rear wheels, thus suppressing the understeer or oversteer in the vehicle and ensuring a more stable posture of the vehicle.

In the present disclosure, when the torque is applied to both the front wheels and the rear wheels, the torque applied to the front wheels may be reduced in the understeer and the torque applied to the rear wheels may be reduced in the oversteer. The known ESP secures yaw stability by applying braking force to the inner rear wheel in the understeer, and by applying braking force to the outer front wheel in the oversteer. This action is based on the principle of applying an additional braking force to the wheel shaft with a sufficient frictional force on the friction circle to form the braking moment, thereby controlling or adjusting the yaw of the vehicle.

On the other hand, the present disclosure is not based on the principle of applying an additional braking force to the shaft with a sufficient frictional force but based on the principle of creating a sufficient the frictional force on a shaft without the frictional force. In the present disclosure, correcting the torque refers to reducing the torque applied to the corresponding drive wheels by the drive device as compared with before-correction, and increasing the torque correction amount refers to further reducing the torque.

In summary, the present disclosure performs front-wheel torque correction based on the equivalent inertia to more actively reduce the slip of the front wheels to secure the lateral frictional force of the front wheels during the understeer, and performs rear-wheel torque correction based on equivalent inertia to more actively reduce the slip of the rear wheels to secure the lateral frictional force of the rear wheels during the oversteer.

Referring to FIG. 2, the control process performed by the controller 20 will be described for each step. First, the controller 20 may be configured to determine whether torque is applied to both the front wheels and the rear wheels during driving. At this time, the controller 20 may be configured to determine whether the torque command for the front-wheel-drive motor 31 and the rear-wheel-drive motor 32 is respectively greater than each command reference value. In other words, whether the torque command of the front-wheel-drive motor 31 is greater than the first command reference value $\alpha 1$ may be determined, and at the same time whether the torque command of the rear-wheel-drive motor 32 is greater than the second command reference value $\alpha 2$ may be determined (S1, S2).

In FIG. 2, the "front wheel torque command" refers to a torque command of the front-wheel-drive motor 31, and the "rear wheel torque command" refers to a torque command of the rear-wheel-drive motor 32. In response to determining that the torque command of the front-wheel-drive motor 31 is greater than the first command reference value α1, and at the same time the torque command of the rear-wheel-drive motor 32 is greater than the second command reference value α2, whether the torque is applied to both the front wheels and the rear wheels may be determined, and then based on the subsequent step, that is, the equivalent inertia information of the drive system, the step of determining the understeer and oversteer may be performed.

Particularly, the vehicle has a front-wheel-side drive system from the front-wheel-drive motor 31 to the front wheels, and a rear-wheel-side drive system from the rear-wheel-drive motor 32 to the rear wheels. The equivalent inertia of each drive system may be calculated based on the operational information of the drive system on the front-wheel side and the rear-wheel side. As described above, the equivalent inertia maybe obtained from the information of the drive system speed and the torque command in the previous control cycle for the motor that is the drive device. In the following description, the equivalent inertia obtained for the front-wheel-side drive system and the rear-wheel-side drive system will be referred to as 'front-wheel-side inertia' and 'rear-wheel-side inertia', respectively.

For example, the front-wheel side equivalent inertia maybe obtained from the speed of the front wheels which is the speed of the drive system and the final torque command of the front-wheel-drive motor 31; and the rear-wheel side equivalent inertia maybe obtained from the speed of the rear wheels and the final torque command of the rear-wheel-drive motor 32. In particular, the final torque command is the motor torque command of the previous control period, and the final torque command becomes the corrected torque command when the torque command has been corrected in the previous control period.

Further, instead of the speed of the front wheels and the speed of the rear wheels, the speed of the drive system may be the speed of the front-wheel-drive motor 31 and the speed of the rear-wheel-drive motor 32. Subsequently, the understeer or oversteer of the vehicle may be determined based on the determined information of the equivalent inertia, and more specifically the controller 20 may be configured to calculate the real-time variation of the front-wheel-side equivalent inertia and the rear-wheel-side equivalent inertia. Then, whether the current vehicle has understeer or oversteer tendencies using variation of the front-wheel equivalent inertia and the rear-wheel equivalent inertia may be determined (S3, S5).

At this time, the controller 20 may be configured to compare the difference of the variation of the equivalent inertia obtained by subtracting the variation of the rear-wheel-side equivalent inertia from the variation of the front-wheel-side equivalent inertia with a predetermined first difference command value β1 (S3). In response to determining that the difference of variation of equivalent inertia is greater than the first difference command value β1, the controller may be configured to determine that the vehicle is understeered (or understeer tendencies). On the other hand, the controller 20 may be configured to compare the difference of the variation of the equivalent inertia obtained by subtracting the variation of the front-wheel equivalent inertia from the variation of the rear-wheel equivalent inertia with a predetermined second difference command value β2 (S5). In response to determining that the difference of the variation of equivalent inertia is greater than the second difference command value β2, the controller may be configured to determine that the vehicle is oversteered (or oversteer tendencies).

When a constant torque command is applied to the front-wheel-drive motor 31 and a constant torque command is applied to the rear-wheel-drive motor 32, when wheel slip does not occur at the front wheels and the rear wheels, the variation of equivalent inertia of each drive system will remain constant. However, when wheel slip occurs in the front wheels and the rear wheels, the variation of equivalent inertia will occur in the front-wheel-side drive system and the rear-wheel-side drive system. When the variation of equivalent inertia occurs in real time based on the value of equivalent inertia as a reference value, which is maintained constantly without having a wheel slip, the real-time variation of equivalent inertia relative to the reference value maybe calculated.

In this manner, the variation in the equivalent inertia with respect to the reference value in the front-wheel-side drive system and the rear-wheel-side drive system, that is, the variation in the front-wheel-side equivalent inertia and the variation in the rear-wheel side equivalent inertia, respectively, maybe calculated. Subsequently, the controller 20 may be configured to perform a correction to reduce the torque command of the front-wheel-drive motor 31 in response to determining the understeer of the vehicle (S4). The controller 20 may be configured to perform a correction to reduce the torque command of the rear-wheel-drive motor 32 in response to determining the oversteer of the vehicle, and vice versa (S5).

In this process, the controller 20 may be configured to determine the torque correction amount from the difference of the variation in the equivalent inertia between the drive wheels, that is, the difference of the variation in the equivalent inertia between the front-wheel side and the rear-wheel side. The controller 20 may be configured to determine the torque correction amount as a function of the difference of the variation of equivalent inertia between the drive wheels. The torque correction amount is for downward adjustment of the torque command. When the torque correction amount is defined as a positive value (+), the torque command may be corrected by subtracting the torque correction amount from the before-correction torque command to reduce the torque command.

Particularly, the difference of the variation of the equivalent inertia between the drive wheels may be determined by subtracting the variation of the rear-wheel equivalent inertia from the variation of the front-wheel equivalent inertia when the controller 20 determines the understeer. When determining the oversteer, the difference of the variation of the equivalent inertia between the drive wheels may be determined by subtracting the variation of the front-wheel-side equivalent inertia from the variation of the rear-wheel equivalent inertia. In addition, in the torque correction method, the controller 20 may be configured to perform proportional control, differential control, or integral control for removing the difference of the variation of the equivalent inertia between the drive wheels with respect to the front-wheel-drive motor 31 or the rear-wheel-drive motor 32.

The correction amount may be calculated as a value that is proportional to the difference of the variation of the equivalent inertia between the drive wheels, or is proportional to the derivative (slope) or proportional to the integral value using a correction gain. In addition, PI control or PID control may be performed to remove the difference of the variation of the equivalent inertia between the drive wheels with respect to the front-wheel-drive motor 31 or the rear-wheel-drive motor 32. However, correction may be performed to reduce the torque command of the front-wheel-drive motor 31 in the understeer, and correction may be performed to reduce the torque command of the rear-wheel-drive motor 32 in the oversteer.

Further, the correction amount in the controller 20 may be determined from the map using the difference of the variation of the equivalent inertia between the drive wheels. As a result, after the torque command is corrected, the controller 20 may be configured to adjust the driving of the front-wheel-drive motor 31 or the rear-wheel-drive motor 32 according to the corrected torque command. Accordingly, in the present disclosure, even when there is no lateral movement while driving the vehicle straight, in a situation where torque is applied to the drive wheels, the determination of the understeer or oversteer of the vehicle becomes possible based on the equivalent inertia, and the posture control of the vehicle becomes possible based on the information of the equivalent inertia.

The first command reference value, the second command reference value, a predetermined first difference reference value, and a predetermined second difference reference value shown in FIG. 2 maybe determined by the controller 20 as a function of vehicle speed, motor speed, motor torque, steering angle, or their direction (+/−). In addition, the above explanation has described an example of the front and rear-wheel drive vehicle having both the front-wheel-drive motor 31 and the rear-wheel-drive motor 32. When the vehicle is a front-wheel-drive vehicle having only the front-wheel-drive motor 31, the controller 20 may be configured to calculate only the front-wheel-side equivalent inertia in the same manner; conversely, in the case of a rear-wheel-drive vehicle having only the rear-wheel-drive motor 32, the controller 20 may be configured to calculate only the rear-wheel-side equivalent inertia in the same manner.

Furthermore, in the front-wheel-drive vehicle, the controller 20 may be configured to determine a situation of the understeer in response to determining that the variation of the front-wheel-side equivalent inertia is greater than the predetermined variation reference value. On the contrary, in the rear-wheel-drive vehicle, the controller 20 may be configured to determine a situation of the oversteer in response to determining that the variation of the rear-wheel-side equivalent inertia is greater than the predetermined variation reference value. In addition, when the situation of the understeer is determined in the front-wheel-drive vehicle, the controller 20 may be configured to perform a correction to reduce the torque command of the front-wheel-drive motor 31 in the same manner using the variation of the front-wheel-side equivalent inertia instead of the difference of the variation of the equivalent inertia between the drive wheels.

In addition, when the situation of the oversteer is determined in the rear-wheel-drive vehicle, controller 20 may be configured to perform a correction to reduce the torque command of the rear-wheel-drive motor 32 using the variation of the rear-wheel-side equivalent inertia. As a result, after the torque command is corrected, the controller 20 may be configured to adjust the driving of the front-wheel-drive motor 31 or the rear-wheel-drive motor 32 according to the corrected torque command.

Although the exemplary embodiments of the present disclosure have been described in detail above, the scope of the present disclosure is not limited thereto, and various modifications and improvements of those skilled in the art using the basic concepts of the present disclosure defined in the following claims are provided, also included in the scope of the present disclosure.

What is claimed is:

1. A method of controlling posture of a vehicle, comprising:
    determining, by a controller, whether torque is applied to drive wheels while driving the vehicle;
    acquiring, by the controller, equivalent inertia information of a drive system in real time based on drive system operation information in response to determining that the torque is being applied to the drive wherein equivalent inertia is obtained from the relationship of:

$$Tq = I \times \alpha$$

where Tq is torque of the drive system, I is the equivalent inertia of the drive system, and a is an angular acceleration of the drive system;
    determining, by the controller, understeer or oversteer of the vehicle from the equivalent inertia information obtained in real time;
    performing, by the controller, a correction to reduce a torque command of the drive system in response to the determining of the understeer or the oversteer of the drive system; and
    after the torque command is corrected, adjusting a driving of the drive system according to the corrected torque command.

2. The method of controlling posture of a vehicle of claim 1, wherein the determining of whether the torque is applied to the drive wheels includes determining that the torque is applied to the drive wheels when a torque command for a drive device for driving the vehicle is greater than a predetermined command reference value.

3. The method of controlling posture of a vehicle of claim 1, wherein the vehicle is a four-wheel-drive vehicle having a front-wheel-drive motor and a rear-wheel-drive motor as drive devices for driving the vehicle.

4. The method of controlling posture of a vehicle of claim 1, wherein the vehicle is a front-wheel-drive vehicle having a front-wheel-drive motor as a drive device for driving the vehicle, or a rear-wheel-drive vehicle having a rear-wheel-drive motor as the drive device for driving the vehicle.

5. The method of controlling posture of a vehicle of claim 1, wherein the drive system operation information is information of a drive system speed and a torque command in a previous control period for a drive device for driving the vehicle.

6. The method of controlling posture of a vehicle of claim 5, wherein the drive system speed is one of speeds of the drive wheels, a speed of the drive device, a transmission input shaft rotational speed, and a transmission output shaft rotational speed.

7. The method of controlling posture of a vehicle of claim 1, wherein the vehicle is a four-wheel-drive vehicle having a front-wheel drive device and a rear-wheel drive device as the drive devices for driving the vehicle, and the equivalent inertia information of the drive system includes a variation of equivalent inertia of a front-wheel side obtained in real time from operational information of a front-wheel-side drive system and a variation of equivalent inertia of a rear-wheel side obtained in real time from operation information of a rear-wheel-side drive system.

8. The method of controlling posture of a vehicle of claim 7, further comprising: determining the understeer or the oversteer of the vehicle in response to determining that a difference between the variation of the equivalent inertia of the front-wheel side and the variation of the equivalent inertia of the rear-wheel side is greater than a predetermined difference reference value.

9. The method of controlling posture of a vehicle of claim 8, further comprising:
   determining, by the controller, the understeer in response to determining that the difference as a result of subtracting the variation of the equivalent inertia of the rear-wheel side from the variation of the equivalent inertia of the front-wheel side is greater than a predetermined first difference reference value; and
   determining, by the controller, the oversteer in response to determining that the difference as a result of subtracting the variation of the equivalent inertia of the front-wheel side from the variation of the equivalent inertia of the rear-wheel side is greater than a predetermined second difference reference value.

10. The method of controlling posture of a vehicle of claim 1, wherein the vehicle is a front-wheel-drive vehicle having a front-wheel drive device as a drive device for driving the vehicle, and the equivalent inertia information of the drive system includes a variation of equivalent inertia of a front-wheel side obtained in real time from operational information of a front-wheel-side drive system.

11. The method of controlling posture of a vehicle of claim 10, further comprising determining the understeer in response to determining that the variation of the equivalent inertia of the front-wheel side is greater than a predetermined variation reference value.

12. The method of controlling posture of a vehicle of claim 1, wherein the vehicle is a rear-wheel-drive vehicle having a rear-wheel drive device as a drive device for driving the vehicle, and the equivalent inertia information of the drive system includes a variation of equivalent inertia of a rear-wheel side obtained in real time from operational information of a rear-wheel-side drive system.

13. The method of controlling posture of a vehicle of claim 12, further comprising determining the oversteer in response to determining that the variation of the equivalent inertia of the rear-wheel side is greater than a predetermined variation reference value.

14. The method of controlling posture of a vehicle of claim 1, further comprising:
   performing, by the controller, a correction to reduce a torque command for a drive device for driving the vehicle in response to determining the understeer or the oversteer; and
   adjusting, by the controller, an operation of the drive device according to a corrected torque command.

15. The method of controlling posture of a vehicle of claim 14, wherein the performing of the correction to reduce the torque command, includes performing the correction to reduce the torque command for a front-wheel drive device in response to determining the understeer and performing the correction to reduce the torque command for a rear-wheel drive device in response to determining the oversteer.

16. The method of controlling posture of a vehicle of claim 14, wherein a torque correction to reduce the torque command is determined based on the equivalent inertia information of a drive system.

17. The method of controlling posture of a vehicle of claim 16, wherein the vehicle is a four-wheel-drive vehicle having a front-wheel drive device and a rear-wheel drive device as the drive devices for driving the vehicle, and the equivalent inertia information of the drive system to determine the torque correction includes a variation of equivalent inertia of a front-wheel side obtained in real time from operational information of a front-wheel-side drive system and a variation of equivalent inertia of a rear-wheel side obtained in real time from operation information of a rear-wheel-side drive system.

18. The method of controlling posture of a vehicle of claim 17, further comprising determining the torque correction amount based on a difference between the variation of the equivalent inertia of the front-wheel side and the variation of the equivalent inertia of the rear-wheel side.

19. The method of controlling posture of a vehicle of claim 16, wherein the vehicle is a front-wheel-drive vehicle having a front-wheel drive device as the drive device for driving the vehicle, and the equivalent inertia information of the drive system to determine the torque correction includes a variation of equivalent inertia of a front-wheel side obtained in real time from operational information of a front-wheel-side drive system.

20. The method of controlling posture of a vehicle of claim 16, wherein the vehicle is a rear-wheel-drive vehicle having a rear-wheel drive device as the drive device for driving the vehicle, and the equivalent inertia information of the drive system to determine the torque correction includes a variation of equivalent inertia of a rear-wheel side obtained in real time from operational information of a rear-wheel-side drive system.

* * * * *